United States Patent [19]

Eguchi et al.

[11] Patent Number: 4,839,798

[45] Date of Patent: Jun. 13, 1989

[54] METHOD AND APPARATUS FOR CONTROLLING JOB TRANSFER BETWEEN COMPUTER SYSTEMS

[75] Inventors: Hiroyoshi Eguchi; Norio Yamada; Itaru Kusuyama; Chikara Saitou, all of Hadano, Japan

[73] Assignee: Hitachi, Ltd., Tokyo, Japan

[21] Appl. No.: 795,463

[22] Filed: Nov. 6, 1985

[30] Foreign Application Priority Data

Nov. 7, 1984 [JP] Japan .............................. 59-234472

[51] Int. Cl.⁴ ............................................ G06F 15/16
[52] U.S. Cl. ................................ 364/200; 364/281.3; 364/281; 364/281.7; 364/281.8
[58] Field of Search ... 364/200 MS File, 900 MS File, 364/300

[56] References Cited

U.S. PATENT DOCUMENTS 4,403,286  9/1983  Fry et al. ............................ 364/200
4,495,562  1/1985  Yamaji et al. ....................... 364/200
4,633,387 12/1986  Hartung et al. ..................... 364/200

Primary Examiner—Gareth D. Shaw
Assistant Examiner—Christina M. Eakman
Attorney, Agent, or Firm—Antonelli, Terry & Wands

[57] ABSTRACT

In a computer network system having a plurality of on-line connected computer systems, each computer system has means to monitor the amount of jobs of its own computer system. Each computer system requests a job to another computer system when the amount of jobs of its own computer system is in short, and the requested computer system transfers a job to the requesting computer system if the amount of jobs of the requested computer system is enough. Each computer system also requests transfer-out of a job to another computer system when the amount of jobs of its own computer system is over, and the requested computer system accepts the request if the amount of jobs of its own computer system is not full, and the requesting computer system transfers the job to the accepting computer system. In this manner, loads to the computer systems are distributed.

9 Claims, 4 Drawing Sheets

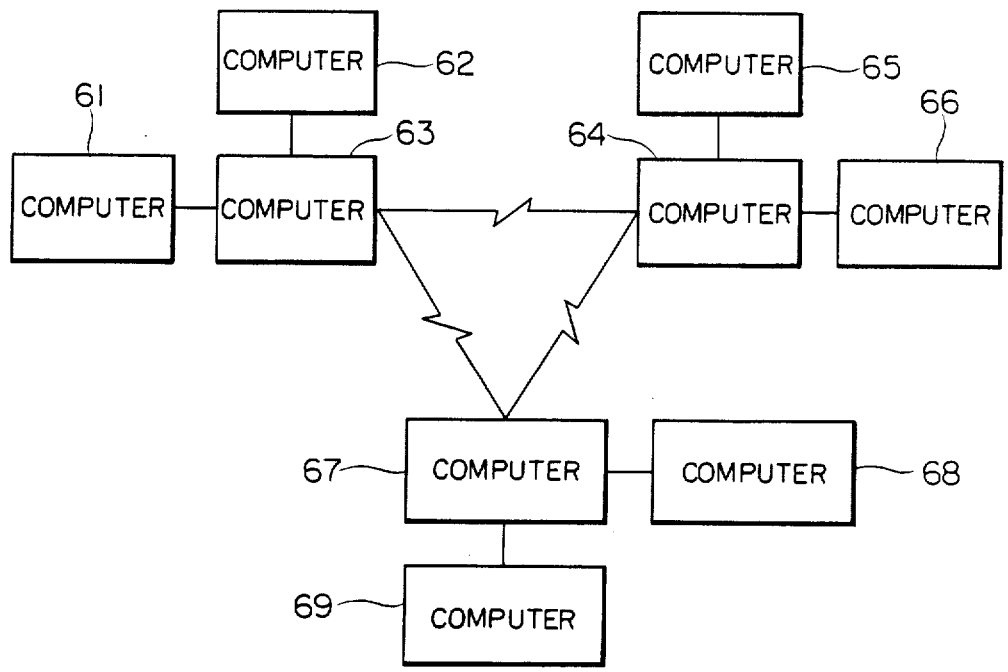

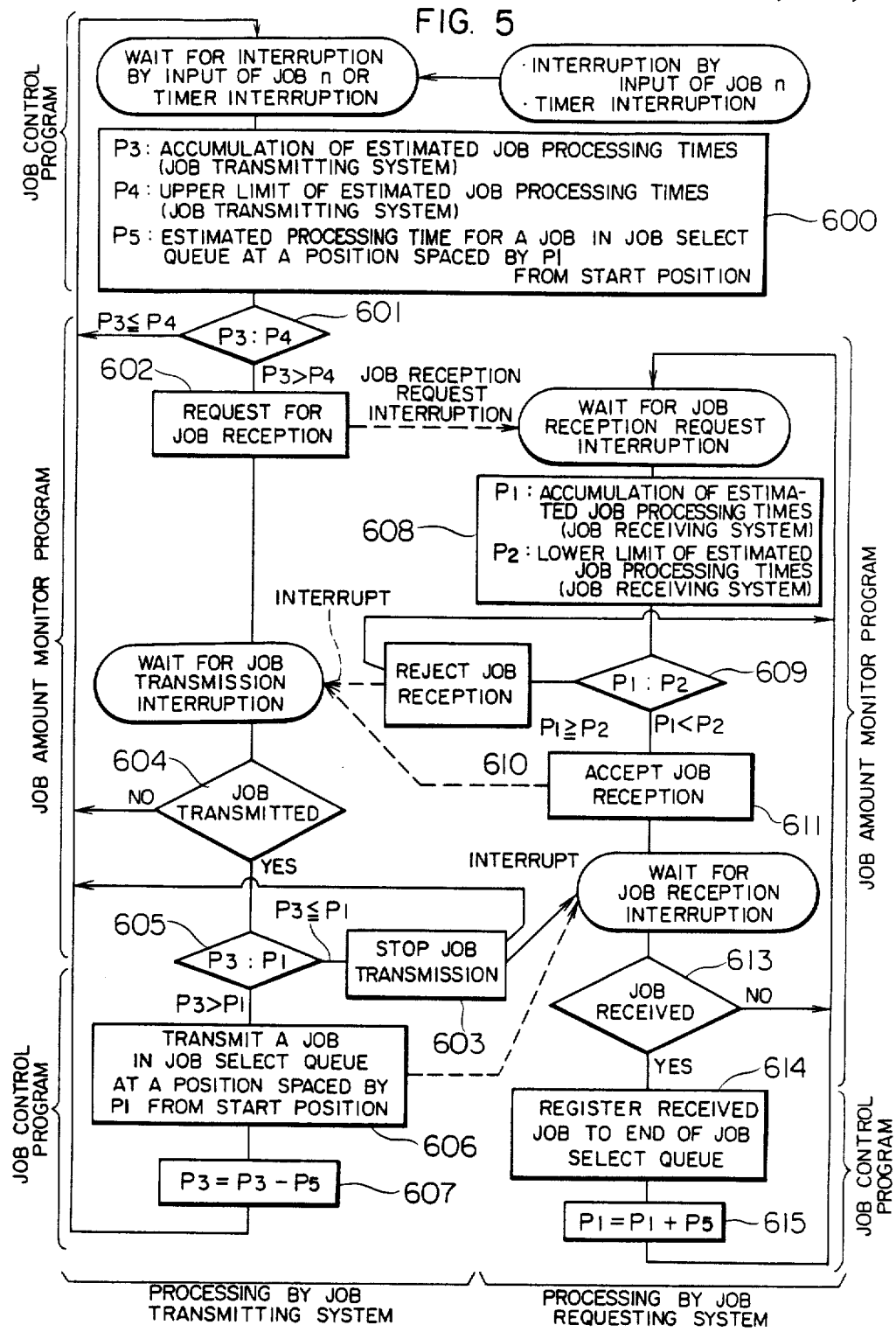

METHOD AND APPARATUS FOR CONTROLLING JOB TRANSFER BETWEEN COMPUTER SYSTEMS

BACKGROUND OF THE INVENTION

1. FIELD OF THE INVENTION

The present invention relates to a network system which on-line connects a plurality of computer systems, and more particularly to a job transfer system operating between computer systems of a network for processing jobs by coordination of the computer systems.

2. DESCRIPTION OF THE PRIOR ART

A system in which a job is transferred from one computer system to another computer system of a plurality of computer systems to request a processing of that job has been disclosed in Japanese Laid-Open Patent Application No. 55-1000 (GB Patent Application No. 27003 filed June 15, 1978). In this system, if a job is assigned to one computer system A and the amount of jobs to be processed by the computer system A is more than a predetermined amount, the newly assigned job is transferred to another computer system B, which processes the job and sends result data back to the computer system A. This system, however, has the following problems (1) If the amount of jobs to be processed by the computer system to which the new job is assigned is not more than a predetermined amount, the new job is not transferred to the other computer system even if the other computer system has no job to process or the amount of jobs to be processed by the other computer system is less than it is able to handle. In this case, it is more effective that the new job is transferred to the other computer system having a shorter job wait time.

(2) The job is transferred only at the time the job is inputted to a computer system. Even if a computer system which has a short job wait time appears, the job is no longer transferred to that computer system.

SUMMARY OF THE INVENTION

It is an object of the present invention to provide a job transfer system operating between computer systems which improves the efficiency of processing in a computer system network.

In accordance with one feature of the present invention, there is provided means for monitoring the amount of jobs in each computer system of the computer system network. With the job monitor means, each computer system requests a job from other computer systems when the amount of jobs waiting processing in that computer system is less than it can handle, and requested computer systems transfer jobs to the requesting computer system if the amount of jobs they have waiting processing is sufficiently large. Each computer system requests transfer-out of a job to other computer systems if the amount of jobs it has is too large, and the requested computer system accepts the receipt of the job if the amount of jobs of its own computer system is not full. The requesting computer system transfers the job to the selected computer system when the selected computer system accepts the receipt.

BRIEF DESCRIPTION OF THE DRAWINGS

FIG. 2 is a diagram showing a job selected queue and a job execution queue, FIG. 3 is a diagram showing a job amount table, FIG. 5 is a flow chart for issuing a job transfer-out request, and FIG. 6 is a block diagram showing a system configuration of a network system is accordance with another embodiment of the present invention.

DESCRIPTION OF THE PREFERRED EMBODIMENTS

Figure 1:
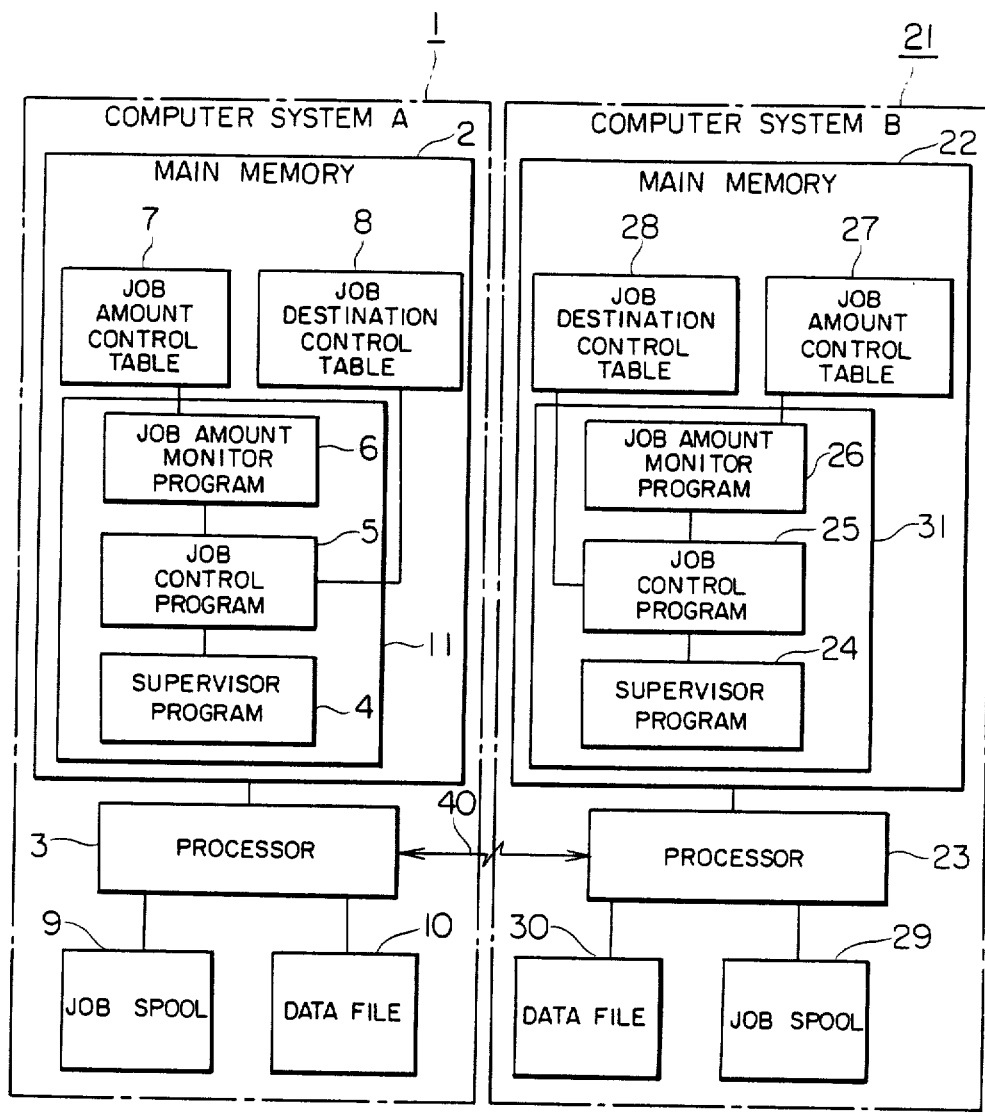
FIG. 1 is a block diagram of a computer network system in accordance with one embodiment of the present invention.

FIG. 1 shows a computer network system in accordance with one embodiment of the present invention. This network on-line connects computer systems A and B. In the computer systems A and B, numerals 3 and 23 denote control processing units (processors) which are interconnected through a network 40. Numerals 11 and 31 denote operating systems for controlling system resources, numerals 4 and 24 denote supervisor programs which integrally control the overall system, numerals 5 and 25 denote job control programs which control input and output of jobs, job data, job output lists, job requests and job transfer-out requests, numerals 6 and 26 denote job amount programs which monitor job amounts, numerals 7 and 27 denote job amount control tables which contain a job select queue 51 and a job execution queue 50 shown in FIG. 2 and a job amount table 52 shown in FIG. 3, numerals 8 and 28 denote job destination control tables which store therein destination computer systems to which processed data for jobs and lists are to be transferred, numerals 9 and 29 denote job spools which store therein jobs and output lists thereof, and numerals 10 and 30 denote data files which store therein job input/output data.

The job transfer operation between the computer systems is now explained.

Figure 4:
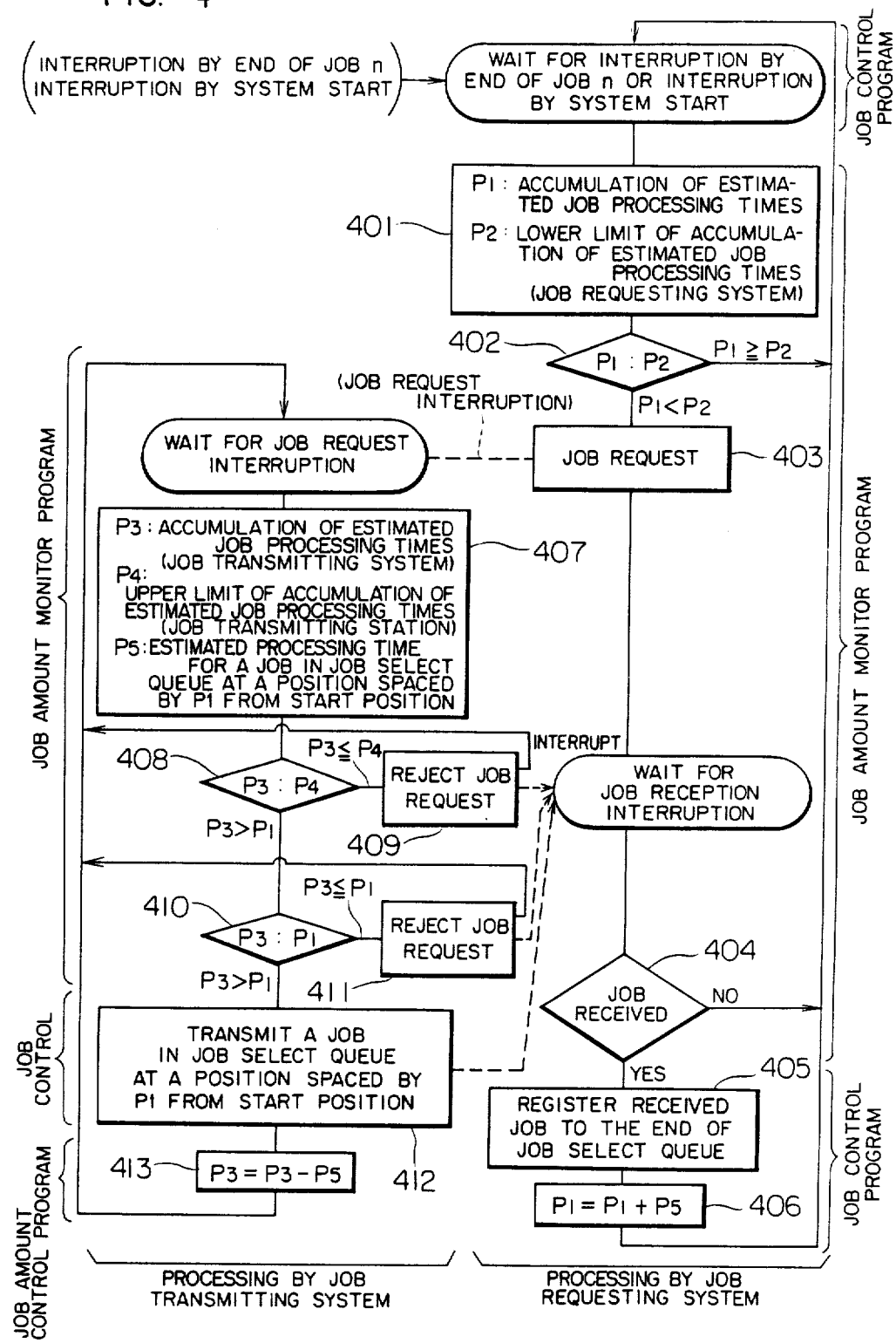
FIG. 4 is a flow chart for issuing a job request.

A computer system requests the transfer of a job to another computer system when a job end interruption or a system starting interruption takes place. This is explained with reference to a flow chart of FIG. 4.

The job amount control tables 7 and 27 have the tables 50, 51 and 52 which store therein information relevant to the respective computer systems. Let us assume that a job n which had been processed in the CPU 23 of the computer system B has terminated and a job end interruption has occurred. Under the control of the job control program 25, the job amount monitor program 26 reads out an accumulated estimated job processing time P1 of the job amount table 52 (FIG. 3) in the job amount control table 27 and a lower limit P2 of estimated accumulated job processing time (step 401). The estimated accumulated job processing time is a total sum of estimated job processing times of all jobs to be processed currently registered in the job execution queue 50 and the job select queue 51 of the computer system B. The estimated job processing times for the completed jobs have been subtracted before the interruption. The estimated job processing time is one of the job parameters and it has been registered in a job registration table for each job. The lower limit P2 of the estimated accumulated job processing time is set when the system is configured, and when P1 is lower than P2 as a critical value, the computer system issues a request to receive a job to be processed, from another computer system. An upper limit of the estimated accumulated job processing time is a threshold value. If P1 is higher than the upper limit, the computer system issues a request to another computer system for transfer-out of a job to be processed to that other computer system.

The values P1 and P2 are then compared (step 402). If P1≧P2, the job request signal is not sent out from the job amount monitor program 26 and the computer system B returns to the job amount end interrupt and system start interrupt queue. If P1<P2 (job amount is less than minimum), the job request signal is sent out from the job amount monitor program 26 (step 403). It is supplied to the supervisor 24 through the job control program 25, and the job request is sent to the CPU 3 of the computer system A from the CPU 23 through the line 40 so that the CPU 3 is interrupted by the job request. The value P1 is also sent to the computer system A. Then, the computer system B waits for the job receipt interruption.

When the computer system A receives the job request interruption from the computer system B, the job amount monitor program 6 reads out an accumulated estimated job processing time (P3) and an upper limit (P4) of the accumulated estimated job processing time from the job amount table 52 in the job amount control table 7, and reads out from the job select queue 51 an estimated job processing time (P5) at a position spaced by P1 from the start position (step 407). Then, P3 and P4 are compared step (408) and if P3≦P4, a job request reject signal is issued (step 409). The job request reject signal is sent to the supervisor 4 through the job control program 5 and the CPU 3 sends the job request reject signal to the on-line 40 to interrupt the computer system B by the job request reject signal. If P3>P4 (job amount is over the upper limit), the job amount monitor program 6 compares P3 with P1 (which has been supplied from the computer system B at the interruption) (step 410), and if P3≦P1 (the job amounts of its own system is less), the job request reject signal is sent (step 411) so that the CPU 3 interrupts the computer system B by the job request reject signal. If P3>P1, a job request accept signal is issued from the job amount monitor program 6. When this signal is issued, the CPU 3 interrupts the CPU 23 for the reception of the job and a job in the job select queue 51 at a position spaced by P1 from the start position and input data for that job are read out from the job spool 9 and the data file 10 under the control of the job control program 5 and they are sent to the computer system B (step 412). After the transmission of the job, the job amount monitor program 6 deletes the transferred job from the job select queue 51 and subtracts and estimated processing time of the transferred job (P5) from the accumulated estimated job processing time (P3) of the job amount table 52 (step 413). Then, the computer system A waits for a job request.

On the other hand, the computer system B interrupted by the computer system A checks to see if it receives the job or not (step 404), and if it is the job reception, it stores the received job and data in the job spool 29 and the data file 30 under the control of the job control program 25, registers the job at the end of the job select queue and stores the job destination address (computer system A) in the job destination control table 28 (step 405). Finally, it adds the estimated processing time (P5) of the received job to the accumulated estimated job processing time (P1) of the job amount table 52 (step 406). Then, the computer system B waits for the job end interruption and the system start interruption.

When the computer system B completes the processing of the job transferred from the computer system A, it transfers the result of the job processing and a list (stored in the data file 30 and the job spool 29) to the job destination address (stored in the job destination control table 28). It also deletes that job from the job destination control table 28 and subtracts an estimated processing time of that job from the accumulated estimated job processing time of the job amount table 52.

In the step 410, the accumulated estimated job processing times of its own system and the requesting system are compared for the following reason. If the accumulated estimated job processing time of its own system is shorter, the job is not transferred because the job execution waiting time is shorter than that when the job is transferred. The comparison in the step 410 may be omitted and the acceptance or rejection of the job transfer may be decided on the basis of the decision in the step 408.

The operation at the job end interruption has been described above. The operation at the system start interruption is similar. The computer systems A and B both have the function shown in FIG. 4. The operation is similar when the computer system A requests the job.

The operation when one computer system requests transfer-out of a job to the other computer system now will be explained with reference to a flow chart of FIG. 5.

The computer systems A and B have the identical functions. It is assumed that the computer system A requests transfer of a job to the computer B. In the computer system A, if the job input interruption or the time interruption occurs, the job amount monitor program 6 reads out the accumulated estimated job processing time (P3) (for the job input interruption, and estimated processing time for the input job has been added thereto) and the upper limit (P4) of the accumulated estimated job processing time from the job amount table 52, and reads out from the job select queue 51 and estimated processing time (P5) of the job at a position spaced by the accumulated estimated job processing time P1 of the computer system B from the start position (step 600). The values P3 and P4 are compared (step 601), and if P3≦P4 (job amount is not above the upper limit), it returns to the job input interrupt and timer interrupt queue. If P3>P4 (job amount is over the upper limit), a job transfer-out request signal is sent from the job amount monitor program 6 (step 602) and it is sent to the supervisor 4 through the job control program 5 so that the computer system B is interrupted by the job transfer-out request from the CPU 3 through the on-line 40. Then, the computer system A waits for the job transmission interruption from the computer system B.

When the computer system B receives the interrruption for the job transfer-out request, the job amount monitor program 26 reads out the accumulated estimated job processing time (P1) and the lower limit (P2) of the accumulated estimated job processing time from the job amount table 52 (step 608), and they are compared (step 609). If P1≧P2, the job amount monitor program 26 sends out the job transfer-out reject signal (step 610), which is sent to the supervisor 24 through the job management program 25 and the computer system A is interrupted by the job transfer-out reject signal from the CPU 23 so that the computer system B waits for a job transfer-out request. If P1<P2 (job amount is not above the lower limit), the job amount monitor program 26 sends out a job transfer-out accept signal (step 611) and the computer system A is then interrupted by the CPU 23 for job transmission and the computer system B waits for the job reception interruption.

The computer system A checks if the interruption from the computer system B is the job transmission interruption or not (step 604), and if it is not the job reception interruption, it waits for the job input interruption and the timer interruption. If it is the job reception interruption, the accumulated estimated job processing time (P3) and the accumulated estimated job processing time (P1 given at the job transmission interruption) of the computer system B are compared (step 605). If P3≦P1 (the job amount of its own system is less than the job amount of the other system and there is no merit in requesting the job processing), the job amount monitor program 6 send out a job transfer-out signal (step 603) and the CPU 3 sends the job transmission stop interruption to the computer system B and the computer system A waits for the job input interruption and the timer interruption. If P3>P1, the computer system A interrupts the computer system B for the job transfer-out and reads out the job at a location in the job select queue spaced by P1 from the start position and the data thereof from the job spool 9 and the data file 10 under the control of the job control program 5 and sends them to the computer system B (step 606). The transmitted job is deleted from the job select queue 5 and the estimated processing time of that job is subtracted from the accumulated estimated job processing time in the job amount table 52 (step 607). Then, the computer system A waits for the job input interruption and the timer interruption.

The interrupted computer system B checks to see if the interruption is for the job reception (step 613), and if it is not for the job reception, it waits for the job transfer-out request interruption. If it is for the job reception, it registers the received job at the end of the job select queue 51, adds the estimated processing time of that job to the accumulated estimated job processing time of the job amount table 52, writes information designating the computer system A into the job destination control table 28 and stores the job and the data into the job spool 29 and the data file 30, respectively (steps 614 and 615).

When the processing of the job transferred from the computer system A is completed, the result data and the output data are sent back to the computer system A from which the job was assigned, as was done in the previous case in which the job was transferred by the job request.

The comparison in the step 605 may be omitted and the job may be unconditionally transmitted upon the job transfer-out interruption. The computer system B also checks the job amount when the job input interruption or the timer interruption takes place, requests the job transfer-out as required, and the computer system A processes it in the same manner as the computer system does.

In the present embodiment, if the job amount is not full in each of the computer systems at the end of processing a job or at the system start, the computer system requests the transfer of a job to the other computer system, and the requested computer system transfers the job to the requesting computer system if the job amount in the requested computer system is over and more than the job amount in the requesting computer system. On the other hand, each computer system requests the job transfer-out to the other computer system if the job amount is over the upper limit when the job input interruption or the timer interruption takes place, and the requested computer system accepts if the job amount is not full, and the requesting computer system sends the job and requests the processing thereof if the job amount of the requesting computer system is more than the job amount of the accepting computer system. Accordingly, the disadvantages (1) and (2) in the prior art computer system are resolved and the network system can be efficiently utilized.

The embodiment implemented in the network system including the two computer systems has been explained. The present invention is also applicable to a network system including more than two computer systems. An example thereof is shown in FIG. 6, in which computer systems 61, 63, 64, 66 and 67 to 69 constitute loosely coupled multiprocessor systems. The computer systems 63, 64 and 67 are on-line connected to form the network system as a whole. When the job amount of the computer systems 61, 62 or 63 is short (at the time of the job end or the system start interruption), the computer system 63 requests a job to the computer system 64 in the same manner as the previous embodiment. If the job amounts of the computer systems 64 to 66 are enough, the computer system 64 transfers the job to the computer system 63, and if the job amounts are short, it rejects the transfer. If the computer system 63 rejects the transfer, the computer system 64 requests the job to the computer system 67. If the job amounts of the computer systems 67 to 69 are enough, the computer system 67 transfers the job to the computer system 63. If the job amount of the computer system 63 is over the upper limit (at the time of the job input interruption or the timer interruption), it requests the job transfer-out to the computer system 64. If the job amounts of the computer systems 64 to 66 are not full, the computer system 64 receives the job from the computer system 63. If the job amounts of the computer systems 64 to 66 are full, the computer system 63 requests the transfer-out of the job to the computer system 67.

The computer systems 64 and 67 similarly request the transfer-out and the transfer-in of the jobs to other computer systems.

In this manner, the jobs are coordinated among the computer systems so that the overall network system can be efficiently operated. Since the job transfer-in and transfer-out requests are issued at the times described above each computer system can be operated independently from the other computer systems.

As described hereinabove, according to the present invention, the jobs are transferred among the computer systems as required so that the computer systems in the network can be most efficiently utilized, and the effect to the operation efficiency of the overall network system is minimized even if each computer system is started or stopped independently from the other computer systems.

We claim:

1. A method for controlling a plurality of computer systems which are interconnected and operate respectively for processing jobs in a predetermined sequence, comprising the steps of:
   (a) detecting, in one computer system, an amount of jobs to be processed in a predetermined sequence by that one computer system; and (b) carrying out a job transfer between said one computer system and another computer system in accordance with the detected amount of jobs by transferring a job from a position in the sequence of jobs at the transferring to a receiving computer system computer system corresponding in time to a position following the last job in the sequence of jobs at the receiving computer system.

2. A control method according to claim 1 wherein the amount of jobs in the step (a) is represented by an accumulated estimated processing time of the jobs to be processed.

3. A method for controlling at least three computer systems which are interconnected to interactively perform data transfers and operate respectively for processing jobs, each computer system having different upper and lower thresholds for job processing, comprising the steps of: in one computer system:
   (a) detecting an amount of jobs to be processed in a predetermined sequence by that one computer system,
   (b) determining if the detected amount of jobs is less than said lower threshold for that one computer system; and
   (c) if it is less than said lower threshold, issuing a transfer request to another computer system to transfer a job thereto; and in the other computer system:
   (d) in response to said transfer request received from said one computer system, determining acceptance or non-acceptance of the job transfer request;
   (e) if the job transfer request is accepted, transferring to the requesting computer system a job from a position in the sequence of jobs at the transferring computer system corresponding in time to a position following the last job in the sequence of jobs at the receiving computer system;
   (f) executing said job transferred from said the other computer system in said one computer system and transferring the result of the job execution to the other computer system therefrom; and
   (g) in response to non-acceptance of the request, issuing the job transfer request from said one computer system to a further computer system.

4. A control method according to claim 3 wherein said one computer system includes a table which contains as said predetermined amount a lower limit of the amount of jobs to be processed by that computer system, and compares the amount of jobs detected in the step (b) with said lower limit.

5. A control method according to claim 3 wherein the amount of jobs to be processed is represented by an accumulation of estimated processing times for a plurality of jobs assigned to said one computer system.

6. A method for controlling a plurality of computer systems which are interconnected and operate respectively for processing jobs in a predetermined sequence, comprising the steps of: in one computer system:
   (a) detecting an amount of jobs to be processed in a predtermined sequence by that one computer system;
   (b) determining if the detected amount of jobs is greater than a predetermined amount for that one computer system; and
   (c) if it is greater than said predetermined amount, issuing a process request requesting transfer of a job to another computer system for processing; and in the other computer system:
   (d) in response to the process request received from said one computer system, determining if the process request is acceptable or not;
   (e) if the process is acceptable, communicating an acceptance of the process request to said one computer system; and in said one computer system:
   (f) in response to receipt of acceptance of the process request from said other computer system, transferring to said other computer system a job from a position in the sequence of jobs at the transferring computer system corresponding in time to a position following the last job in the sequence of jobs at the receiving computer system; and
   (g) in response to receipt of non-acceptance of the process request; issuing the process request to a further computer system.

7. A control method according to claim 6 wherein said one computer system includes a table which contains as said predetermined amount an upper limit of the amount of jobs to be processed by that computer system, and compares the amount of jobs detected in the step (b) with said upper limit.

8. A control method according to claim 6 wherein the amount of jobs to be processed is represented by an accumulation of estimated processing times for a plurality of jobs assigned to said one computer system.

9. In a network of computer systems in which the computer systems are interconnected and operate respectively for processing jobs in a predetermined sequence, each computer system comprising
   detection means for detecting an amount of jobs in a sequence of jobs to be processed by that computer system;
   means for requesting transfer of a job between that computer system and another computer system in accordance with an amount of jobs detected by said detection means; and
   means responsive to a job transfer request from the other computer system for transferring to said other computer system a job from a position in the sequence of jobs at the transferring computer system corresponding in time to a position following the last job in the sequence of jobs at the other computer system.

* * * * *